US012226975B2

(12) United States Patent
Totani

(10) Patent No.: US 12,226,975 B2
(45) Date of Patent: Feb. 18, 2025

(54) BAG MAKING APPARATUS, BAG MAKING METHOD AND BAG

(71) Applicant: Totani Corporation, Kyoto (JP)

(72) Inventor: Mikio Totani, Kyoto (JP)

(73) Assignee: Totani Corporation, Kyoto (JP)

( * ) Notice: Subject to any disclaimer, the term of this patent is extended or adjusted under 35 U.S.C. 154(b) by 77 days.

(21) Appl. No.: 17/922,602

(22) PCT Filed: May 18, 2021

(86) PCT No.: PCT/JP2021/018783
§ 371 (c)(1),
(2) Date: Nov. 1, 2022

(87) PCT Pub. No.: WO2021/241328
PCT Pub. Date: Dec. 2, 2021

(65) Prior Publication Data

US 2023/0166475 A1 Jun. 1, 2023

(30) Foreign Application Priority Data

May 29, 2020 (JP) ................................ 2020-094568

(51) Int. Cl.
*B31B 70/16* (2017.01)
*B31B 70/64* (2017.01)
(Continued)

(52) U.S. Cl.
CPC .............. *B31B 70/16* (2017.08); *B31B 70/64* (2017.08); *B31B 70/81* (2017.08); *B31B 2160/20* (2017.08)

(58) Field of Classification Search
CPC ......... B31B 70/16; B31B 70/64; B31B 70/81; B31B 2160/20
(Continued)

(56) References Cited

U.S. PATENT DOCUMENTS 4,055,109 A * 10/1977 Kan .................... B65D 75/008 493/239
5,383,836 A * 1/1995 Long ...................... B42D 5/025 493/357
(Continued)

FOREIGN PATENT DOCUMENTS

EP 3263478 1/2018
JP H0195033 4/1989
(Continued)

*Primary Examiner* — Sameh Tawfik
(74) *Attorney, Agent, or Firm* — JCIPRNET

(57) ABSTRACT

A bag making apparatus and a bag making method make bags. The bag has a first panel part and a first flap part formed by folding a first sheet part, and a second panel part and a second flap part formed by folding a second sheet part. The first and second panel parts face each other. The first and second flap parts are interposed between the first and second panel parts and face each other. An open edge is formed by folded edges of the first and second sheet parts. The bag further comprises adhesive located between the open edge and the engagement tool, interposed between the first and second flap parts and extending across the widths of the first and second sheet parts to peelably adhere the first and second flap parts to each other. Alternatively, the second sheet part may only consists of the second panel part.

3 Claims, 13 Drawing Sheets

(51) Int. Cl.
*B31B 70/81* (2017.01)
*B31B 160/20* (2017.01)

(58) Field of Classification Search
USPC .......................................................... 493/235
See application file for complete search history.

(56) References Cited

U.S. PATENT DOCUMENTS

| | | | | |
|---|---|---|---|---|
| 5,938,243 | A * | 8/1999 | De Santo | B65H 45/28 493/193 |
| 10,493,715 | B2 * | 12/2019 | Totani | B31B 50/10 |
| 11,285,686 | B2 * | 3/2022 | Goto | B65D 33/34 |
| 2002/0142905 | A1 * | 10/2002 | Toth | B31D 5/0047 493/350 |
| 2011/0212815 | A1 * | 9/2011 | Totani | B65D 31/10 493/243 |
| 2014/0187401 | A1 * | 7/2014 | Totani | B31B 50/64 493/196 |
| 2016/0129628 | A1 * | 5/2016 | Nagata | B31B 70/8132 493/200 |
| 2018/0104923 | A1 * | 4/2018 | Totani | B31B 70/18 |
| 2019/0030850 | A1 * | 1/2019 | Tan | B31B 70/14 |

FOREIGN PATENT DOCUMENTS

| | | |
|---|---|---|
| JP | H0546748 | 6/1993 |
| JP | 3052894 | 10/1998 |
| JP | 2005225542 | 8/2005 |
| JP | 2016193572 | 11/2016 |
| WO | 2016024366 | 2/2016 |

* cited by examiner

BAG MAKING APPARATUS, BAG MAKING METHOD AND BAG

CROSS-REFERENCE TO RELATED APPLICATION

This application is a 371 application of an international PCT application serial no. PCT/JP2021/018783, filed on May 18, 2021, which claims the priority benefit of Japan application JP2020-094568, filed on May 29, 2020. The entirety of the above-mentioned patent application is hereby incorporated by reference herein and made a part of this specification.

TECHNICAL FIELD

The present application relates to a bag making apparatus and a bag making method for making bags from a web and a continuous engagement tool. The present application also relates to a bag with an engagement tool.

BACKGROUND

A bag such as a plastic bag includes, for example, an engagement tool such as a zipper or a hook-and-loop fastener. The bag can be freely opened and closed with the engagement tool. Patent document 1 discloses a bag with an engagement tool.

The bag in Patent document 1 includes panel parts facing each other. Furthermore, adhesive is applied to the inner surfaces of both panel parts between an open edge of the bag and the engagement tool to peelably adhere the panel parts to each other. The bag is opened by the panel parts being peeled off from each other. After peeling, the bag can be opened and closed with the engagement tool. Such bags have been attracting attention because of their convenience.

The panel parts of the bag in Patent document 1 may snugly overlap with each other near the open edge. In this case, it is hard to expand the open edge by pulling apart the panel part, and thus, hard to open the bag.

The present application provides a bag making apparatus and a bag making method for making bags which are easy to open. Also, the present application provides a bag which is easy to open.

CITATION LIST

Patent Document

Patent document 1: JPH01-95033A

SUMMARY

According to an aspect of the present application, there is provided a bag making apparatus for making bags from a web and a continuous engagement tool. The web has a first surface, a second surface, a first side section and a second side section. The continuous engagement tool includes a first member and a second member which are configured to be detachably engaged with each other. The bag making apparatus includes: an applicator configured to apply adhesive to at least one of the first side section or the second side section on the first surface in a longitudinal direction of the web; a first folding device configured to fold the web along two first fold lines extending in the longitudinal direction of the web such that the first and second side sections face the second surface; a second folding device configured to, after application of the adhesive and folding of the web along the two first fold lines, fold the web along a second fold line extending in the longitudinal direction of the web between the two first fold lines such that the first and second side sections face each other with the adhesive interposed therebetween; a welding device configured to weld the first and second members to the second surface in the longitudinal direction of the web; and a cross cut device configured to, after welding of the first and second members and folding of the web along the second fold line, cross-cut the web, the continuous engagement tool and the adhesive in a width direction of the web so as to make bags each having an open edge formed from two folded edges which result from the folding of the web along the two first fold lines.

The bag making apparatus according to another aspect includes: an applicator configured to apply adhesive in a longitudinal direction of the web to the first side section on the first surface and/or to the second side section on the second surface; a first folding device configured to fold the web along a first fold line extending in the longitudinal direction of the web such that the first side section faces the second surface; a second folding device configured to, after application of the adhesive and folding of the web along the first fold line, fold the web along a second fold line extending in the longitudinal direction of the web such that the first and second side sections face each other with the adhesive interposed therebetween; a welding device configured to weld the first and second members to the second surface in the longitudinal direction of the web; and a cross cut device configured to, after welding of the first and second members and folding of the web along the second fold line, cross-cut the web, the continuous engagement tool and the adhesive in a width direction of the web so as to make bags each having an open edge including a folded edge which results from the folding of the web along the first fold line.

The adhesive may be heat-sensitive adhesive. The bag making apparatus may further include a heat device configured to heat the heat-sensitive adhesive so as to peelably adhere the first and second side sections to each other via the heat-sensitive adhesive.

The bag making apparatus may further include a slit device configured to slit the web along the second fold line after the folding of the web along the second fold line.

According to another aspect of the present application, there is provided a bag making method for making bags from a web and a continuous engagement tool. The web has a first surface, a second surface, a first side section and a second side section. The continuous engagement tool includes a first member and a second member which are configured to be detachably engaged with each other. The bag making method includes: applying adhesive to at least one of the first side section or the second side section on the first surface in a longitudinal direction of the web; folding the web along two first fold lines extending in the longitudinal direction of the web such that the first and second side sections face the second surface; after application of the adhesive and folding of the web along the two first fold lines, folding the web along a second fold line extending in the longitudinal direction of the web between the two first fold lines such that the first and second side sections face each other with the adhesive interposed therebetween; welding the first and second members to the second surface in the longitudinal direction of the web; and after welding of the first and second members and folding of the web along the second fold line, cross-cutting the web, the continuous engagement tool and the adhesive in a width direction of the web to make bags each having an open edge formed from two folded edges which result from the folding of the web along the two first fold lines.

The bag making method according to another aspect includes: applying adhesive in a longitudinal direction of the web to the first side section on the first surface and/or to the second side section on the second surface; folding the web along a first fold line extending in the longitudinal direction of the web such that the first side section faces the second surface; after application of the adhesive and folding of the web along the first fold line, folding the web along a second fold line extending in the longitudinal direction of the web such that the first and second side sections face each other with the adhesive interposed therebetween; welding the first and second members to the second surface in the longitudinal direction of the web; and after welding of the first and second members and folding of the web along the second fold line, cross-cut the web, the continuous engagement tool and the adhesive in a width direction of the web to make bags each having an open edge including a folded edge which results from the folding of the web along the first fold line.

The adhesive may be heat-sensitive adhesive. The bag making method may further include heating the heat-sensitive adhesive to peelably adhere the first and second side sections to each other via the heat-sensitive adhesive.

The bag making method further include slitting the web along the second fold line after the folding of the web along the second fold line.

According to yet another aspect of the present application, there is provided a bag having an open edge, the bag including: a first panel part and a first flap part which are formed by folding of a first sheet part; and a second panel part and a second flap part which are formed by folding of a second sheet part. The first and second panel parts face each other. The first and second flap parts are interposed between the first and second panel parts and face each other. The open edge is formed by a first folded edge of the first sheet part and a second folded edge of the second sheet part. The bag further includes an engagement tool interposed between the first and second panel parts and extending across widths of the first and second sheet parts. The engagement tool includes a first member and a second member which are configured to be detachably engaged with each other. The first member is disposed on the first panel part. The second member is disposed on the second panel part. The bag further includes adhesive located between the open edge and the engagement tool, interposed between the first and second flap parts and extending across the widths of the first and second sheet parts to peelably adhere the first and second flap parts to each other.

The first folded edge may be shifted from the second folded edge in a direction away from the engagement tool.

The bag may have a through hole located between the open edge and the adhesive and perpetrating through the first and second panel parts and the first and second flap parts. The bag may further include a handle formed by the first and second panel parts and the first and second flap parts between the through hole and the open edge.

A bag according another aspect includes: a first panel part and a flap part which are formed by folding of a sheet part; and a second panel part, wherein the first and second panel parts face each other, wherein the flap part is interposed between the first and second parts, and wherein the open edge is formed by a folded edge of the sheet part and an end edge of the second panel part, the bag further including an engagement tool interposed between the first and second panel parts and extending across widths of the sheet part and the second panel part, the engagement tool including a first member and a second member which are configured to be detachably engaged with each other, the first member being disposed on the first panel part, the second member being disposed on the second panel part, the bag further including adhesive located between the open edge and the engagement tool, interposed between the flap part and the second panel part, and extending across the widths of the sheet part and the second panel part to peelably adhere the flap part and the second panel part to each other.

The end edge of the second panel part may be shifted from the folded edge in a direction away from the engagement tool.

The bag may have a through hole located between the open edge and the adhesive and perpetrating through the first and second panel parts and the flap part. The bag may further include a handle formed by the first and second panel parts and the flap part between the through hole and the open edge.

DETAILED DESCRIPTION

A bag, a bag making apparatus and a bag making method according to the implementations will now be described with reference to the accompanying drawings. Elements illustrated in the Figures are not drawn to scale, but only to illustrate function or operation thereof.

Figure 1A:
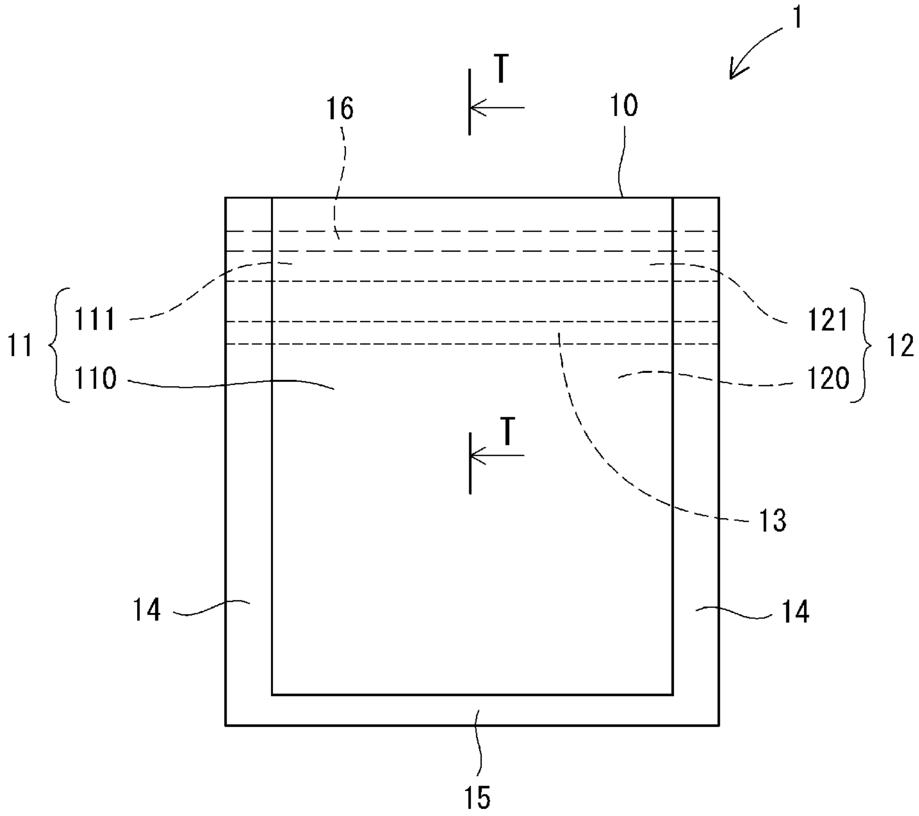
FIG. 1A is a schematic front view of a bag according to an implementation.
Figure 1B:
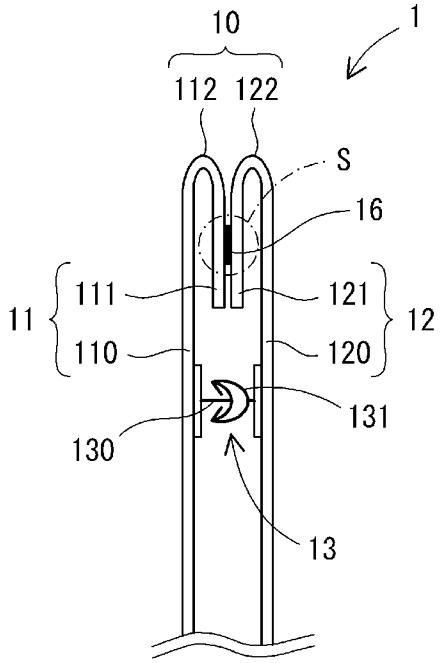
FIG. 1B is an enlarged cross sectional view taken along a T-T line in FIG. 1A.

FIG. 1A and FIG. 1B illustrate an example bag 1. FIG. 1B is a cross sectional view taken along the T-T line in FIG. 1A. The bag 1 has an open edge 10. The bag 1 further includes a first panel part 110 and a second panel part 120 facing each other. The bag 1 further includes a first flap part 111 and a second flap part 121 which are interposed between the panel parts 110 and 120 and face each other.

The bag 1 includes a first sheet part 11 and a second sheet part 12. The sheet part 11 is folded along a fold line extending across the width of the sheet part 11. The panel part 110 and the flap part 111 are formed by this folding of the sheet part 11. In other words, the panel part 110 and the flap part 111 are formed as one piece. The sheet part 12 is folded along a fold line extending across the width of the sheet part 12. The panel part 120 and the flap part 121 are formed by this folding of the sheet part 12. In other words, the panel part 120 and the flap part 121 are formed as one piece.

Each of the sheet parts 11 and 12 in the implementation is a plastic film. The film may be a single-layer or multi-layer structure. The film of the multi-layer structure may include a base layer as one outer layer that functions as structural material, and a sealant layer as the other outer layer that functions as sealant. The film of the multi-layer structure may be used in such a manner that its base layer constitutes the outer surface of the panel part 110, 120, and its sealant layer constitutes the inner surface (facing surface) of the panel part 110, 120. Alternatively, each of the sheet parts 11 and 12 may include a base made of paper and a film or resin material laminated partially or fully to the base.

As illustrated in FIG. 1B, the open edge 10 is formed by a first folded edge 112 resulting from folding of the first sheet part 11 and a second folded edge 122 resulting from folding of the second sheet part 12.

The bag 1 includes an engagement tool 13 interposed between the panel parts 110 and 120 and extending across the widths of the sheet parts 11 and 12. The engagement tool 13 extends parallel to the open edge 10. The engagement tool 13 is located apart from the tips of the flap parts 111 and 121 in the direction away from the open edge 10. It is well-known that the bag 1 can be opened and closed freely with the engagement tool 13.

As illustrated in FIG. 1B, the engagement tool 13 includes a first member 130 and a second member 131 which face each other and are configured to be detachably engaged with each other. The first member 130 is attached to the inner surface of the panel part 110 by means of welding, etc., and the second member 131 is attached to the inner surface of the panel part 120 by means of welding, etc. The engagement tool 13 in the implementation is a zipper. The member 130 is a male member, and the member 131 is a female member. The engagement tool 13 may be, for example, a hook-and-loop fastener instead.

As illustrated in FIG. 1A, the bag 1 further includes side sealed sections 14 extending across the length of the bag 1 along the opposite side edges of the sheet parts 11 and 12. The side sealed sections 14 include: the portions in which the panel parts 110 and 120 are sealed to each other along the opposite side edges thereof except for the area where the flap parts 111 and 121 extend; the portions in which the panel part 110 and the flap part 111 are sealed to each other along the opposite side edges of the flap part 111; and the portions in which the panel part 120 and the flap part 121 are sealed to each other along the opposite side edges of the flap part 121. Here, the flap parts 111 and 121 in the implementation are not sealed to each other along the opposite side edges thereof. In other words, the side sealed sections 14 in the implementation are not formed along the opposite side edges of the flap parts 111 and 121 between the flap parts 111 and 121. Alternatively, the side sealed sections 14 may further include portions in which the flap parts 111 and 121 are sealed to each other along the opposite side edges thereof.

The bag 1 further includes a bottom sealed section 15 extending across the width of the bag 1 along the end edges of the sheet parts 11 and 12 (the panel parts 110 and 120) located opposite to the open edge 10. The bottom sealed section 15 consists of the portion in which the panel parts 110 and 120 are sealed to each other along the end edges thereof.

Figure 1C:
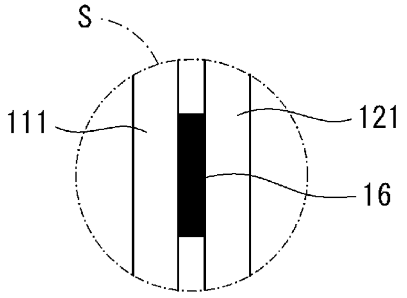
FIG. 1C is an enlarged view of an area S in FIG. 1B.

FIG. 1C is an enlarged view of the region S in FIG. 1B. As illustrated in FIG. 1A to FIG. 1C, the bag 1 includes adhesive 16 interposed between the flap parts 111 and 121, located between the open edge 10 and the engagement tool 13, and extending across the widths of the sheet parts 11 and 12 to peelably adhere the flap parts 111 and 121 to each other. The adhesive 16 in the implementation is part-coating.

A user can expand the open edge 10 and peel off the flap parts 111 and 121 from each other against the adhesive strength of the adhesive 16, thereby opening the bag 1. After peeling off, a user can freely open and close the bag 1 using the engagement tool 13.

Figure 5A:
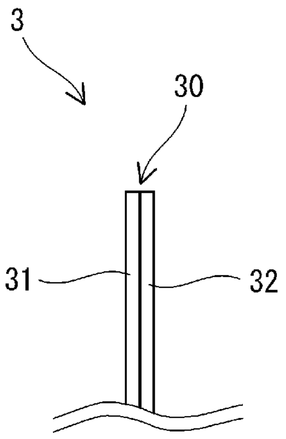
Prior Art FIG. 5A
FIG. 5A illustrates a partial cross section of a bag according to the prior art.

FIG. 5A illustrates a partial cross section of the bag 3 according to the prior art disclosed in Patent document 1. The bag 3 includes panel parts 31 and 32, and an open edge 30 is formed by the end edges of the panel parts 31 and 32. The bag 3 also includes an engagement tool (not shown) and adhesive (not shown).

In FIG. 5A, if the panel parts 31 and 32 snugly overlap with each other near the open edge 30, it is hard to expand the open edge 30 and thus hard to open the bag 3. In contrast, in FIG. 1B, a gap is formed by the folded edges 112 and 122 between these 112 and 122, which makes it easy to expand the open edge 10 and thus easy to open the bag 1.

In FIG. 5A, the open edge 30 may easily cause injury, such as cutting a finger by the open edge 30. In contrast, in FIG. 1B, since the open edge 10 is constituted by the folded edges 112 and 122, it is less likely to cause injury by the open edge 10.

The bag 1 has a thickness corresponding to four sheets (the total thickness of the parts 110, 111, 120 and 121) near the open edge 10. This facilitates holding the bag 1. In addition, the fact that the flap parts 111 and 121 are peelably adhered to each other via the adhesive 16 at this easy-to-hold location also improves easiness to open the bag 1.

Figure 2:
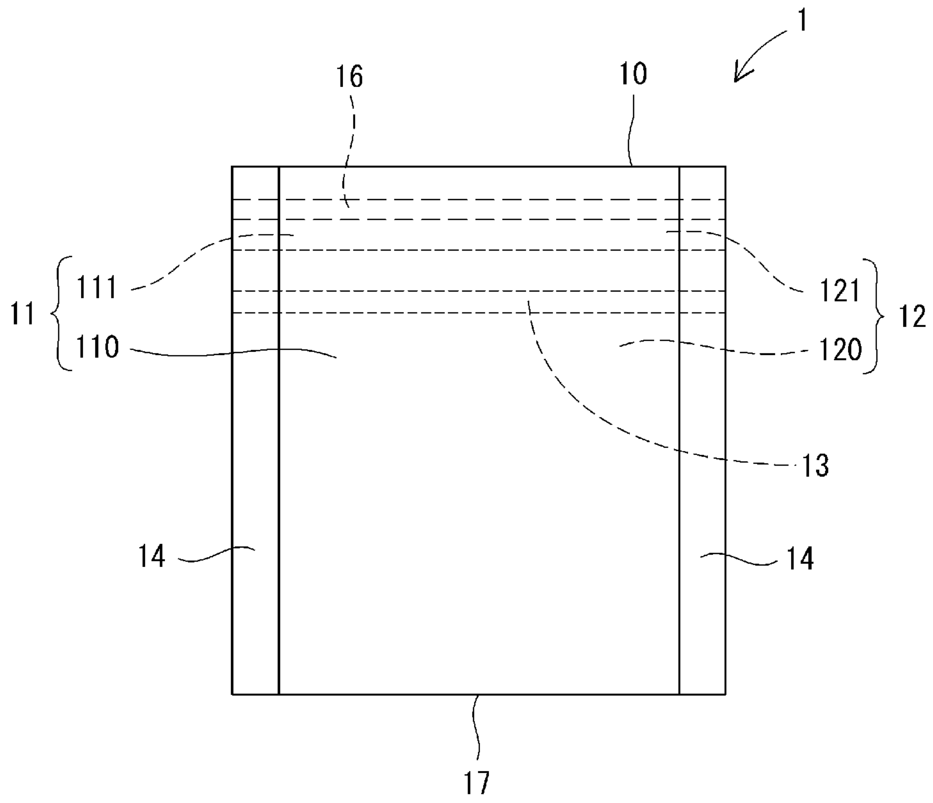
FIG. 2 is a schematic front view of another example bag.

FIG. 2 illustrates another example bag 1. As illustrated in FIG. 2, the first sheet part 11 and the second sheet part 12 may be formed as one piece. In other words, a single sheet is folded along a fold line extending across the width of the sheet, and the sheet parts 11 and 12 are formed by this folding. The end edge located opposite to the open edge 10 is formed by an additional folded edge 17 which results from this folding of the single sheet. Thus, the bag 1 of FIG. 2 does not include the bottom sealed section 15 (FIG. 1A).

Figure 3:
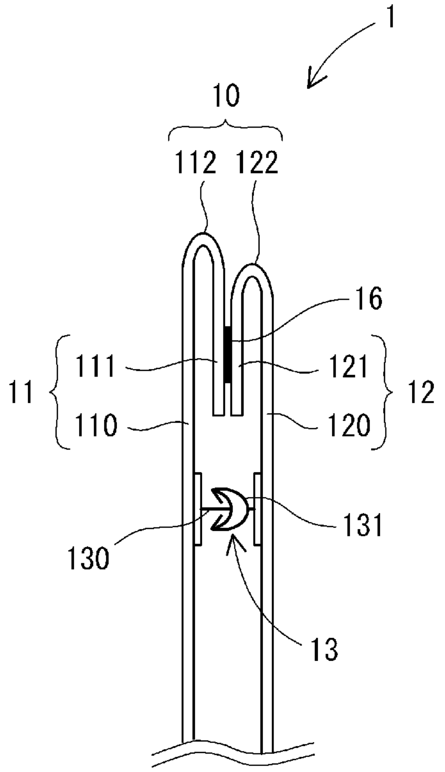
FIG. 3 illustrates a partial cross section of another example bag.

FIG. 3 illustrates another example bag 1. As illustrated in FIG. 3, one folded edge 112 may be shifted from the other folded edge 122 in the direction away from the engagement tool 13. The shift amount is, for example, 1 to 3 mm.

Figure 5B:
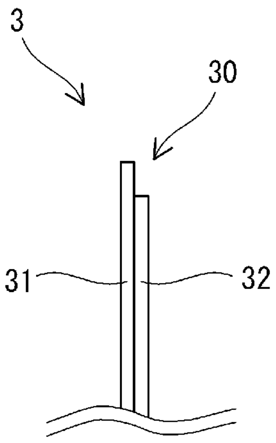
Related Art FIG. 5B
FIG. 5B illustrates a partial cross section of a bag according to the related art.

FIG. 5B illustrates a partial cross section of a bag 3 according to the related art. This bag 3 is a variation of the bag 3 in FIG. 5A, in which the end edge of one panel part 13 is shifted with respect to the end edge of the other panel part 32 by, for example, 1 to 3 mm. In comparison with the bag 3 in FIG. 5A, the bag 3 in FIG. 5B makes it easier to pull apart the panel part 31, 32 at the open edge 30. It is clear from a comparison of FIG. 3 with FIG. 5B that the sheet parts 11 and 12 in FIG. 3 are much easier to be pulled apart near the open edge 10 than the bag 3 in FIG. 5B.

Figure 4C:
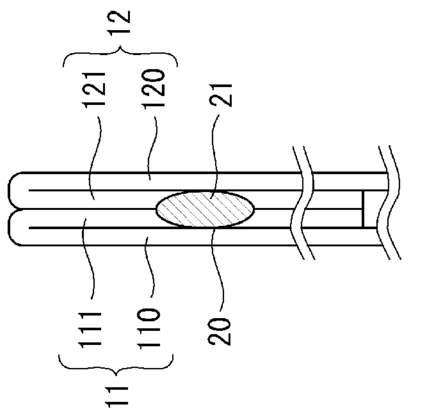
FIG. 4C is a cross sectional view taken along a Q-Q line in FIG. 4A.
Figure 4B:
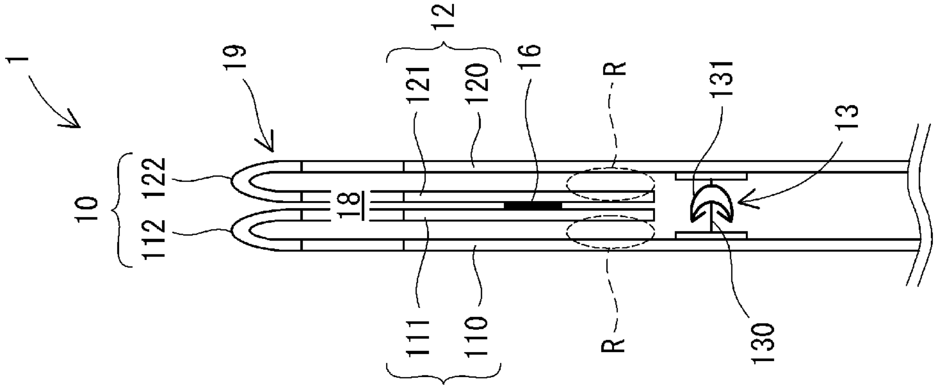
FIG. 4B is a cross sectional view taken along a P-P line in FIG. 4A.
Figure 4A:
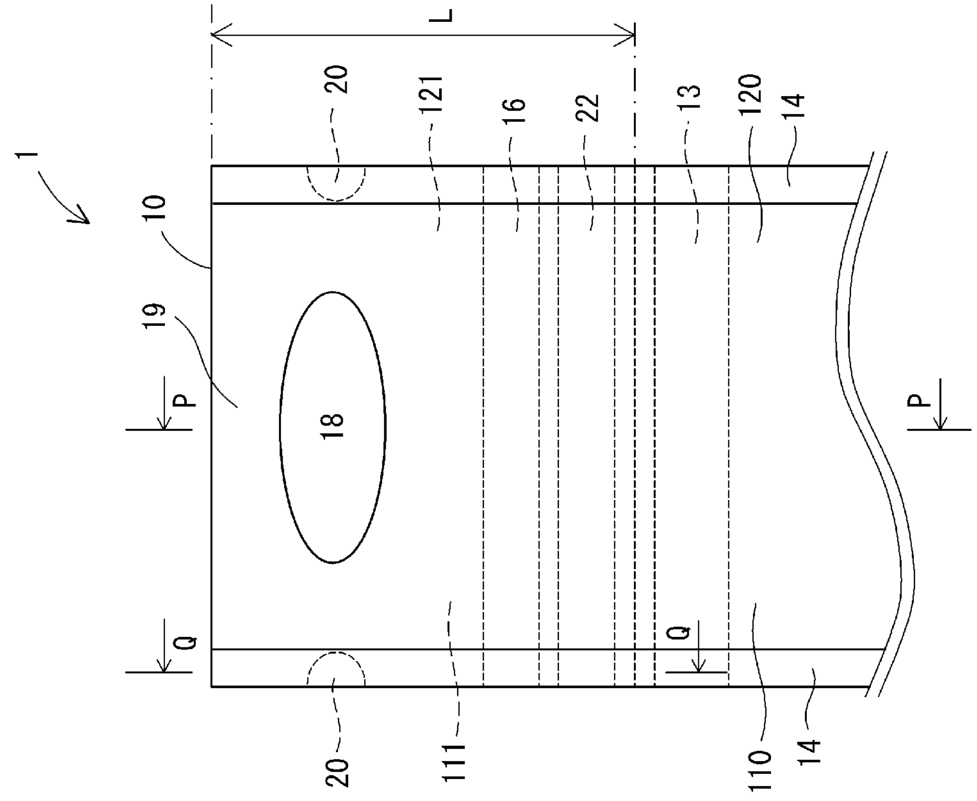
FIG. 4A is a schematic front view of another example bag.

FIG. 4A to FIG. 4C illustrate another example bag 1. FIG. 4B is a cross section taken along the P-P line in FIG. 4A, and FIG. 4C is a cross section taken along the Q-Q line in FIG. 4A. In this bag 1, a through hole 18 is formed to penetrate through the panel parts 110 and 120 and the flap parts 111 and 121 between the open edge 110 and the engagement tool 13. Thereby, a handle 19 is formed between the through hole 18 and the open edge 10 by the panel parts 110 and 120 as well as the flap parts 111 and 121. The handle 19 has a thickness corresponding to four sheets, and therefore, is sturdy and easy to hold.

As illustrated in FIG. 4A, notches 20 may be formed on the opposite sides of the flap parts 111 and 121. Sealant 21 (FIG. 4C) may be filled into each notch 20, so that the panel parts 110 and 120 are sealed to each other via the filled sealant 21. Where the sealant layer of the multi-layer film constitutes the inner surface of each panel part 110, 120 as described above, the sealant layers of the panel parts 110 and 120 are sealed to each other at the notches 20 as they face each other directly at the notches 20. Where the flap parts 111 and 121 are not sealed to each other along the opposite side edges thereof, each of the sheet parts 11 and 12 may flap towards the outside of the bag 1 in the area L where the flap parts 111 and 121 extend. The sealant 21 reduces this flapping. The above configuration is useful when the flap parts 111 and 121 are long in order to form the handle 19. Instead of the notches 20, holes may be formed in the flap parts 111 and 121. The notches 20 or the holes may be formed, for example, by means of punching the sheet parts 11 and 12 (the flap parts 111 and 121) in advance.

The bag 1 may further include a restraining sealed section 22 extending across the widths of the sheet parts 11 and 12. The restraining sealed section 22 includes the portion in which the panel part 110 and the flap part 111 are sealed to each other in the tip of the flap part 111, and the portion in which the panel part 120 and the flap part 121 are heat-sealed to each other in the tip of the flap part 121. If the restraining sealed section 22 is not formed so that the tips of the flap parts 111 and 121 are not restrained as illustrated by the regions R in FIG. 4B, there is a possibility that, in taking out contents, the contents will enter between the panel part 110 and the flap part 111 and/or between the panel part 120 and the flap part 121 through the region(s) R. The restraining sealed section 22 prevents this.

The configuration(s) of each example bag 1 may be incorporated into another example bag 1. For example, the notches 20 or holes in FIG. 4A used for sealing the panel parts 110 and 120 to each other or the aforementioned restraining sealed section 22 may be included in the bag 1 with no handle in FIG. 1A.

Figure 6A:
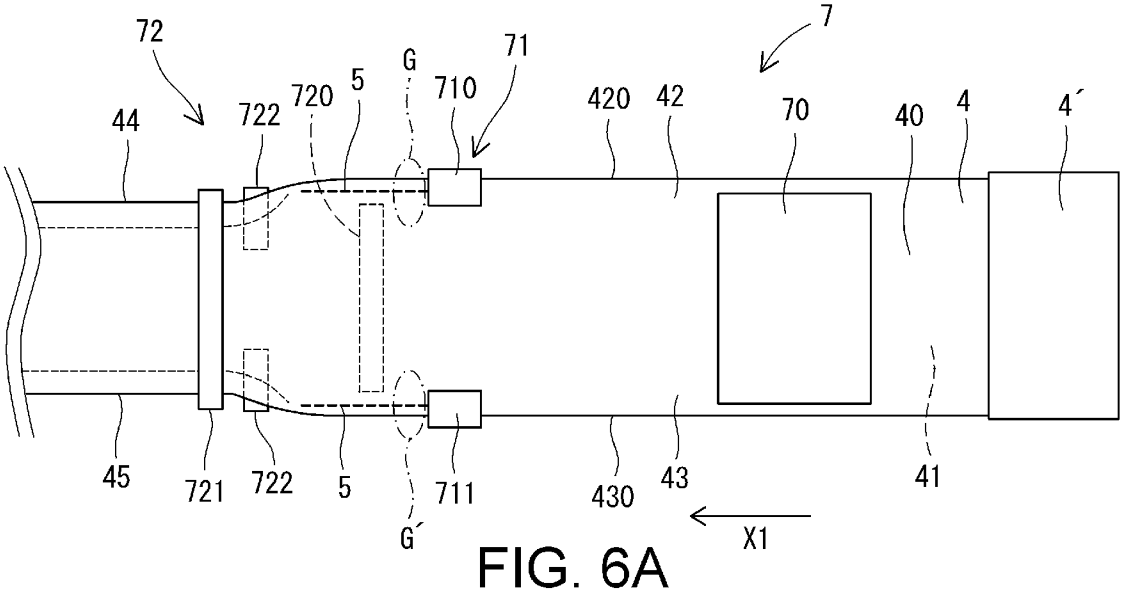
FIG. 6A is a schematic plan view of an upstream section of a bag making apparatus according to an implementation.

The example of the bag making apparatus and the bag making method will be described. FIG. 6A illustrates the upstream section of the bag making apparatus 7. The bag making apparatus 7 include a feed device (not shown) that continuously unrolls a web 4 from a roll 4' and feeds the web 4 in the longitudinal direction of the web 4. The feed device includes, for example, at least one pair of feed rollers. The reference sign $X_1$ designates the feed direction.

The web 4 has a first surface 40 and a second surface 41. In FIG. 6A, the web 4 is fed with the first surface 40 facing upward and the second surface 41 facing downward. The web 4 further has a first side section 42, a second side section 43, a first side edge 420, and a second side edge 430.

The web 4 in the implementation is a plastic film. The film has a laminated structure, the surface 40 of which is formed by a base layer and the surface 41 of which is formed by a sealant layer having a lower melting point than that of the base layer. The base layer is OPP (biaxially oriented polypropylene), ONY (biaxially oriented nylon) or PET (biaxially oriented polypropylene), etc. The sealant layer is CPP (non-oriented polypropylene) or LDPE (low density polyethylene), etc. Different from the implementations, the web 4 may have a single-layer structure made of such material as polyethylene. For example, the web 4 may include a base made of paper and a film or plastic material laminated partially or fully to the base.

The bag making apparatus 7 may include a printer 70 that prints on the web 4. The printer 70 is disposed facing the surface 40 such that characters, figures, patterns, etc. are printed on the surface 40 of the web 4 using ink by the printer 70 while the web 4 is fed through the printer 70. An accumulator (not shown) may be disposed to ensure a feed distance enough to dry the ink.

Figure 6B:
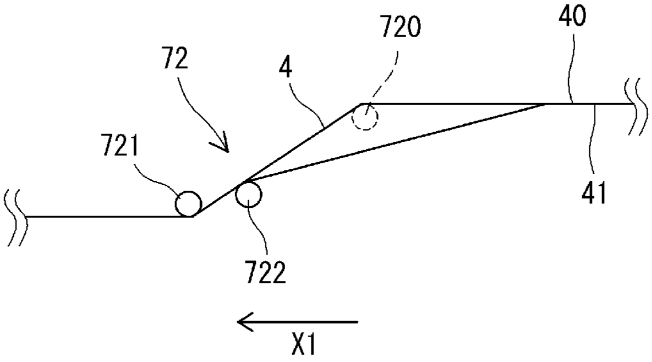
FIG. 6B is a front view of a folding device in FIG. 6A, and FIG. 6C and FIG. 6D are enlarged illustrations of areas G and G' in FIG. 6A, respectively.
Figure 6C:
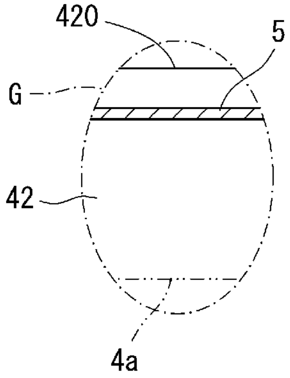
Figure 6D:
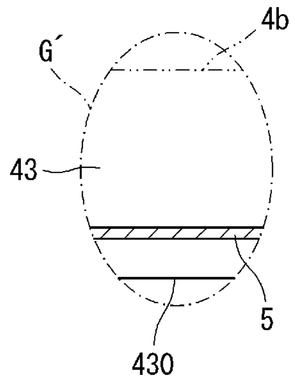

The bag making apparatus 7 includes an applicator 71 configured to apply adhesive 5 to the side sections 42 and 43 on the surface 40 along the longitudinal direction of the web 4. The applicator 71 in the implementation includes a first application unit 710 disposed facing the surface 40 to apply the adhesive 5 to the side section 42, and a second application unit 711 disposed facing the surface 40 to apply the adhesive 5 to the side section 43. While the web 4 is fed through the applicator 71, the adhesive 5 is applied to the side sections 42 and 43 by the application units 710 and 711, respectively. Thereby, the adhesive 5 is applied in the longitudinal direction of the web 4 as illustrated in FIG. 6C and FIG. 6D, which are enlarged views of the areas G and G' in FIG. 6A.

Adhesive that develops its adhesive property upon being heated and is cured upon heat removal, i.e., heat-sensitive adhesive is used as the adhesive in the implementation. The heat-sensitive adhesive in the implementation is part-coating. Part-coating may be, for example, solvent-based or water-based adhesive that is commonly available on the market. Alternatively, the heat-sensitive adhesive may be, for example, adhesive such as EVA (ethylene vinyl acetate)-based, olefinic-based, or polyamide (nylon)-based hot melt.

The bag making apparatus 7 includes a first folding device 72 configured to fold the web 4 along two first fold lines 4*a* and 4*b* (FIG. 6C, FIG. 6D) extending in the longitudinal direction of the web 4, such that its side sections 42 and 43 face the surface 41. The first folding device 72 in the implementation is a well-known configuration including first, second, and third guide rollers 720, 721 and 722, as illustrated in FIG. 6A and FIG. 6B. As the web 4 is fed, it is guided by the guide rollers 720, 721 and 722 to be folded along the first fold lines 4*a* and 4*b* such that the side sections 42 and 43 face the surface 41. The reference numerals 44 and 45 in FIG. 6A designate the folded edges resulting from folding of the web 4 along the fold lines 4*a* and 4*b*, respectively.

Figure 7A:
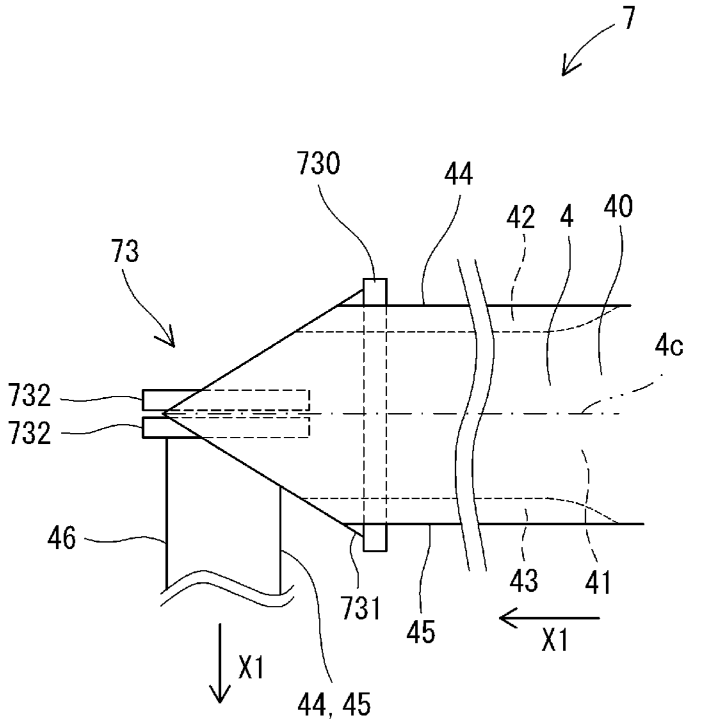
FIG. 7A is a schematic plan view of a midstream section of the bag making apparatus in FIG. 6A.
Figure 7B:
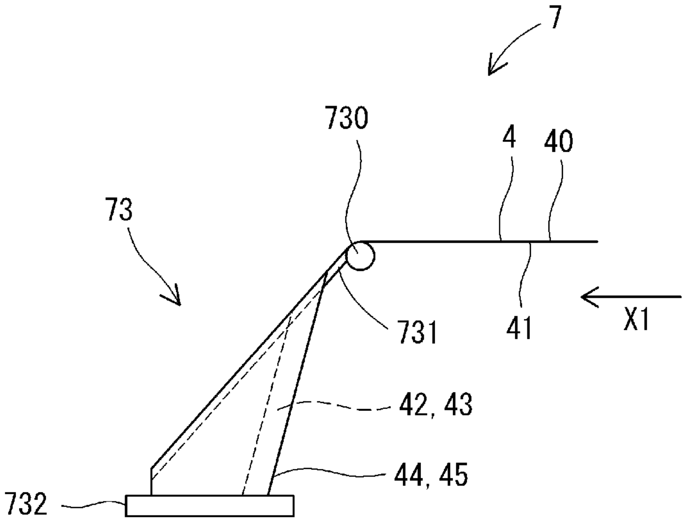
FIG. 7B is a front view of FIG. 7A.

FIG. 7A and FIG. 7B illustrate the midstream section of the bag making apparatus 7. The bag making apparatus 7 further includes a second folding device 73 configured to, after the above-mentioned application of the adhesive 5 and the folding of the web 4 along the fold lines 4*a* and 4*b*, fold the web 4 along a second fold line 4*c* (FIG. 7A) which extends in the longitudinal direction of the web 4 between the fold lines 4*a* and 4*b*.

The second folding device 73 is a well-known guide device including a guide roller 730, a triangular plate 731, and suction rollers 732. As the web 4 is fed, it is guided by the guide roller 730, the triangular plate 731 and the suction rollers 732 to be folded along the fold line 4*c* and to cause the feed direction $X_1$ to be diverted by 90°. The fold line 4*c* in the implementation coincides with the longitudinal centerline of the web 4.

In this way, the web 4 is folded in half by the second folding device 73 such that the side sections 42 and 43 face each other with the adhesive 5 interposed therebetween. The outer surface of the web 4 which has been folded in half is the surface 40 which is the base layer, and the inner surface of this web 4 is the surface 41 which is the sealant layer. The reference numeral 46 designates the folded edge resulting from folding of the web 4 along the fold line 4*c*.

The folded edges 44, 45, and 46 may be heated for creasing.

The adhesive 5 in the implementation has not yet adhered the side sections 42 and 43 to each other because it has not yet developed the adhesive property up to this step.

After this step, the feed of the web 4 is appropriately converted from continuous feed to intermittent feed by a dancer device (not shown). Therefore, the web 4 is repeatedly paused and fed.

Figure 8A:
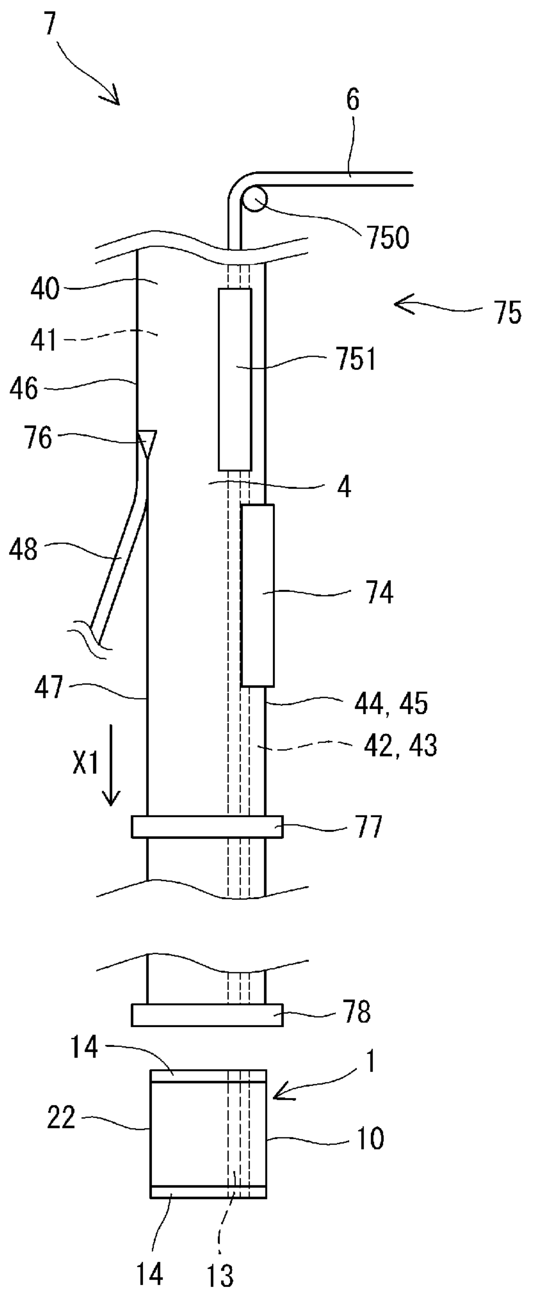
FIG. 8A is a schematic plan view of a downstream section of the bag making apparatus in FIG. 6A.

FIG. 8A illustrates the downstream section of the bag making apparatus 7. The bag making apparatus 7 includes a heat device 74 configured to heat the adhesive 5 after folding of the web 4 along the fold line 4*c* (46) so as to peelably adhere the side sections 42 and 43 to each other via the adhesive 5 (not shown in FIG. 8A).

While the web 4 is fed through the heat device 74, the heat device 74 heats the adhesive 5 sandwiched between the side sections 42 and 43 using a heater or heat seal bars, etc., thereby developing the adhesive property of the adhesive 5. This causes the adhesive 5 to peelably adhere the side sections 42 and 43 to each other.

The heat device 74 in the implementation heats the adhesive at a temperature lower than the melting point of the sealant layer that constitutes the surface 41, to prevent melting of the sealant layer. Thus, the adhesive 5 has been selected in advance, which is capable of developing its adhesive property at a temperature lower than the melting point of the sealant layer. Where the web 4 is a single-layer film, the heat device 74 heats the adhesive 5 at a temperature lower than the melting point of the single-layer film to prevent melting of the single-layer film.

The bag making apparatus 7 further includes a welding device 75 configured to supply a continuous engagement tool 6 to the web 4 in the longitudinal direction of the web 4 and to then weld the engagement tool 6 to the surface 41 of the web 4 in the longitudinal direction of the web 4.

Figure 8B:
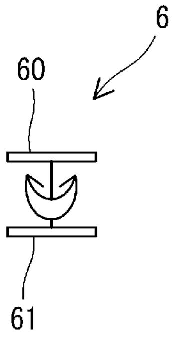
FIG. 8B is a schematic cross section of a continuous engagement tool.

FIG. 8B illustrates a cross section of the continuous engagement tool 6. The engagement tool 6 includes a first member 60 and a second member 61 which are configured to be detachably engaged with each other. The engagement tool 6 in the implementation is a zipper made of plastic. The member 60 is a male member, and the member 61 is a female member.

The welding device 75 in the implementation supplies the engagement tool 6 with the members 60 and 61 engaged with each other, and introduces it between the two layers of the folded web 4. For this purpose, the welding device 75 includes a guide unit (not shown) (such as extension rollers) that expands the two layers of the web 4 at the folded edges 44 and 45, and a guide roller 750 for guiding the engagement tool 6 and introducing the engagement tool 6 between the two layers of the web 4 through the area expanded by the guide unit.

The welding device 75 further includes a welding unit 751 configured to weld the members 60 and 61 to the surface 41 of the web 4 in the longitudinal direction of the web 4 after the engagement tool 6 is introduced between the two layers of the web 4. The welding unit 751 welds the members 60 and 61 to the surface 41 by means of, for example, heat-sealing using a pair of heat seal bars or laser irradiation using a laser device. Specifically, the member 60 is welded to one layer of the web 4, and the member 61 is welded to the other layer of web 4.

The bag making apparatus 7 further includes a slitter 76 for slitting the web 4 along the fold line 4*c* (FIG. 7A), i.e., along the folded edge 46. As the web 4 is fed, it is slit in its longitudinal direction by the slitter 76. Thereby, an open edge 47 is formed. The waste 48 generated during this is wound up and collected.

The bag making apparatus 7 further includes a cross seal device 77 configured to seal the web 4 in the width direction of the web 4 after folding of the web 4 along the fold line 4*c*. The cross seal device 77 in the implementation heat-seals the web 4, for example using a pair of heat seal bars, during every pause phase of the intermittent feed cycle. Since the surface 41, which is the sealant layer, constitutes the inner surface of the folded web 4, sealant layer of the surface 41 is melted by the cross seal device 77. Thus, the two layers of the web 4 are heat-sealed to each other. One layer of the web 4 and the side section 42 are heat-sealed to each other, and the other layer of the web 4 and the side section 43 are heat-sealed to each other. Thereby, a cross sealed section (not shown) is formed. In contrast, the side sections 42 and 43 are not heat-sealed to each other because their facing surfaces are formed by the surface 40, which is the base layer.

The bag making apparatus 7 further includes a cross cut device 78 configured to cross-cut the web 4, the adhesive 5 and the engagement tool 6 in the width direction of the web 4 after welding of the members 60 and 61, folding of the web 4 along the fold line 4*c*, slitting of the web 4, and formation of the cross sealed section. The cross cut device 78 in the implementation cross-cuts the web 4, the adhesive 5 and the engagement tool 6, for example using a cutter, in the width direction of the web 4 during every pause phase of the intermittent feed cycle. The position of cross-cutting is the position of the cross sealed section. A bag 1 is made every cross-cutting.

Referring to FIG. 1A, FIG. 1B and FIG. 8A, the sheet parts 11 and 12 of the bag 1 are formed from two layers of the web 4. The flap parts 111 and 121 are formed from the side sections 42 and 43. The open edge 10 is (the folded edges 112 and 122 are) formed from the folded edges 44 and 45. The adhesive 16 is formed from the adhesive 5. The engagement tool 13 is formed from the engagement tool 6. Each of the side sealed sections 14 is formed from the cross sealed section. The open edge 22 (FIG. 8A) opposite to the open edge 10 is formed from the open edge 47. The contents may be filled through this open edge 22. After the filling, the bag 1 may be sealed along the open edge 22 such that the bottom sealed section 15 is formed.

In this way, the aforementioned bags 1, which are easy to hold and open, are successively made. The adhesive 5 is applied to the first surface 40 which will form the outer surfaces of the bags 1. Thus, the step for applying the adhesive 5 and the step for printing on the web 4 can be carried out simultaneously at the same stage.

The step for slitting the web 4 using the slitter 76 may be eliminated so that the bag 1 illustrated in FIG. 2 is made. The folded edge 17 (FIG. 2) of the bag 1 is formed from the folded edge 46. The adhesive 5 may not be heated by the heat device 74. After the bag 1 is shaped, the contents may be filled into the bag 1 through the open edge 10, and then the adhesive 16 (formed from the adhesive 5) may be heated by another heat device to develop its adhesive property, thereby peelably adhering the flap parts 111 and 121 to each other.

In the case of making the bags 1 in FIG. 3, the application position of the applicator 71 and the positions of the fold lines 4*a*, 4*b* and 4*c* may be adjusted such that the folded edge 44 is shifted with respect to the folded edge 45 when the web 4 is folded along the fold line 4*c*.

In the case of making the bags 1 each with the handle 19 as illustrated in FIG. 4A, the application position of the applicator 71 and the fold lines 4*a*, 4*b* and 4*c* are properly adjusted to obtain sufficient lengths of the side sections 42 and 43. Then, the punching machine (not shown) of the bag making apparatus 7 punches a through hole, which corresponds to the through hole 18, in the web 4 before cross-cutting, or punches a hole 18 in the bag 1 after cross-cutting.

Figure 9A:
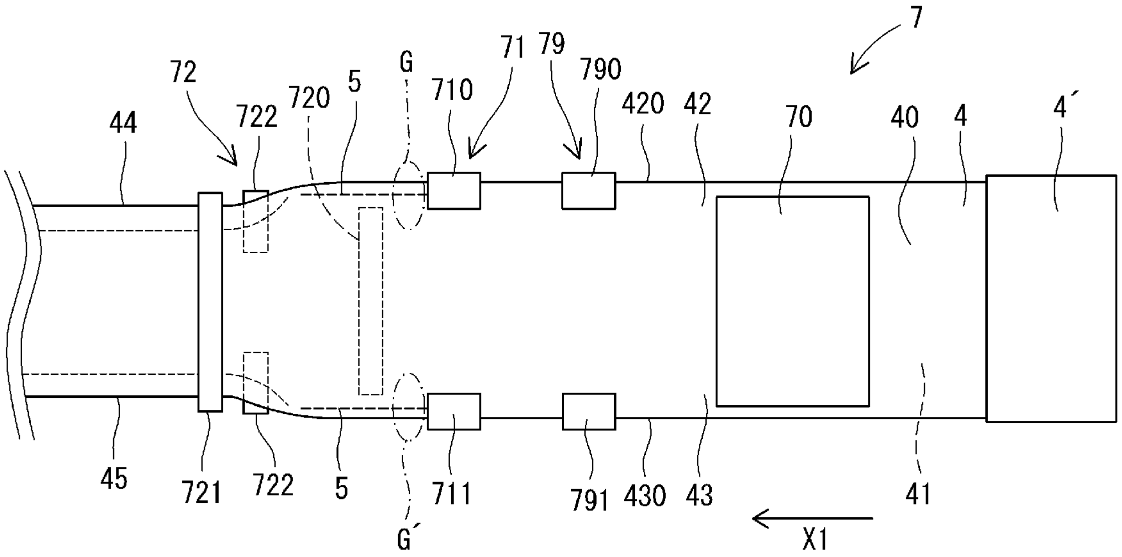
FIG. 9A is a schematic plan view of an upstream section of another example bag making apparatus.
Figure 9B:
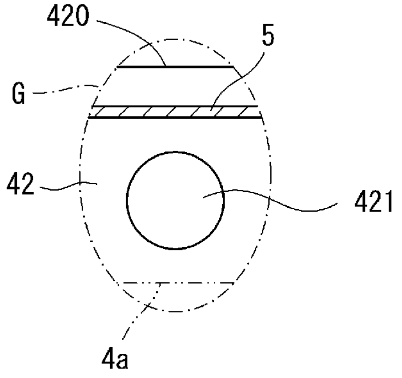
FIG. 9B and FIG. 9C are enlarged illustrations of areas G and G' in FIG. 9A, respectively.
Figure 9C:
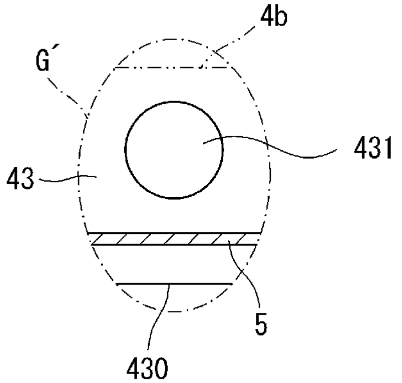

As illustrated in FIG. 9A, the bag making apparatus may include a punching machine 79 configured to punch holes 421 and 431 (FIG. 9B, FIG. 9C) in the side sections 42 and 43. The punching machine 79 may include a first punching unit 790 configured to punch a first hole 421 in the side section 42 between the fold line 4*a* and the side edge 420, at a position not interfere with the adhesive 5, for example using a punching blade, and a second punching unit 791 configured to punch a second hole 431 in the side section 43 between the fold line 4*b* and the side edge 430 at a position not to interfere with the adhesive 5, for example using a punching blade.

When the web 4 is then folded along the fold line 4*c* by the folding device 73, these holes 421 and 431 are aligned with each other. As described above, when the web 4 including the base layer and the sealant layer is then heat-sealed by the cross seal device 77, the side sections 42 and 43 are not heat-sealed to each other. Therefore, the flap parts 111 and 121 of the bag 1 are not sealed to each other along the opposite side edges thereof. During this heat-sealing, the sealant layer of the surface 41 (inner surface) of the web 4 melts so that the sealant flows into the holes 421 and 431. Thereby, the two layers of the folded web 4 are sealed to each other via the sealant which has flowed into the holes 421 and 431.

Then, when the web 4 is cross-cut by the cross cut device 78, the holes 421 and 431 are divided into two, resulting in the notches 20 (FIG. 4A, FIG. 4C). Therefore, the sealant 21 (FIG. 4C) is formed from the sealant which has flowed into the holes 421 and 431.

The bag making apparatus 7 may further include a longitudinal seal device (not shown) configured to heat-seal one layer of the web 4 and the side section 42 to each other, and the other layer of web 4 and the side section 43 to each other in the width direction of web 4 after folding of it along the fold line 4*c*. The longitudinal seal device performs heat-sealing, for example using a pair of heat seal bars, to form a longitudinal sealed section during every pause phase of the intermittent feed cycle. As described above, the side sections 42 and 43 are not sealed to each other at this time. Thus, when the bag 1 is shaped, the restraining sealed section 22 (FIG. 4A) is formed from the longitudinal sealed section.

The bag 1 illustrated in FIG. 4A is made by the combination of the above respective steps.

The applicator 71 may apply the adhesive 5 to only one of the side sections 42 and 43. Unlike the implementation, the adhesive 5 may be applied to at least one of the side sections 42 or 43 by the applicator 71 after the web 4 is folded by the first folding device 72. Adhesive, e.g., viscous adhesive, other than heat-sensitive adhesive, may be used as adhesive 5, 16. In this case, when the web 4 is folded by the second folding device 73, the side sections 42 and 43 are peelably adhered to each other via the adhesive 5, without the step for heating the adhesive 5 using the heat device 74.

Figure 10C:
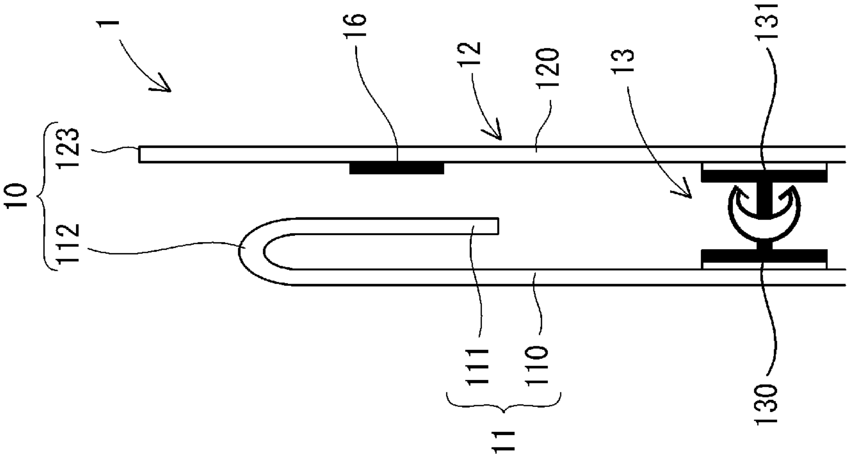
FIG. 10A to FIG. 10C schematically illustrate yet another example bag.
Figure 10B:
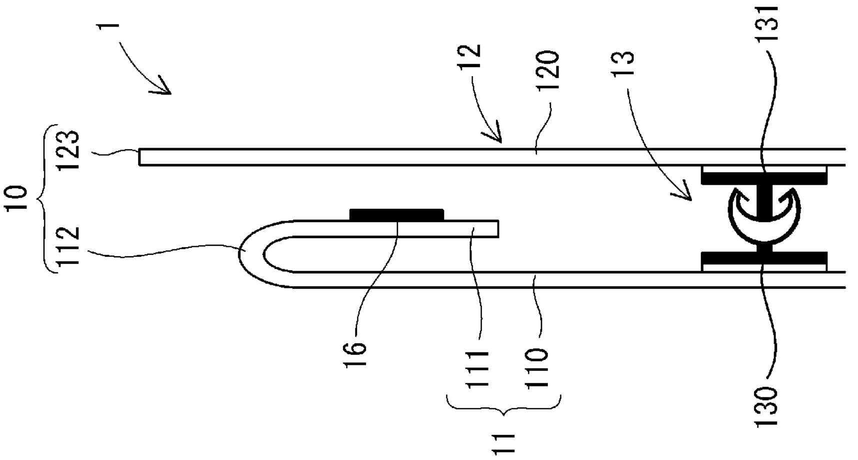
Figure 10A:
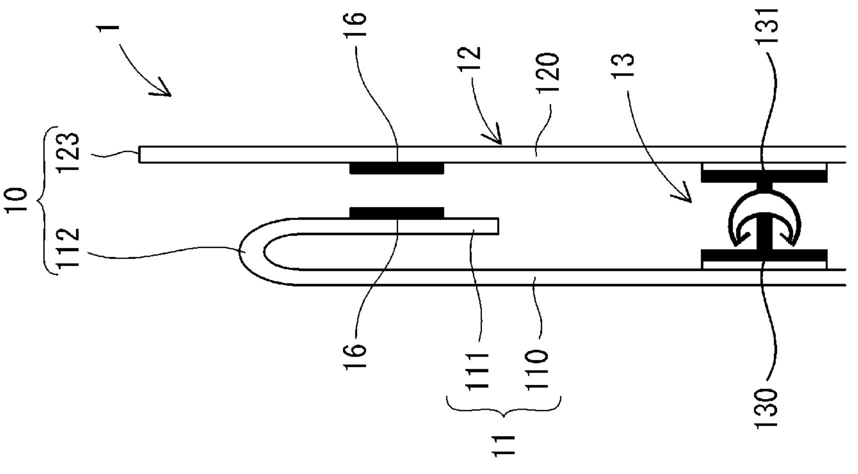

FIG. 10A to FIG. 10C illustrate yet another example bag 1 in partial cross section. One of the differences from the aforementioned bag 1 is that one sheet part 11/12, e.g., the sheet part 12 is not folded. Thus, in this example, the sheet part 12 only consists of the panel part 120 and is not provided with any flap part. Only one flap part 111 is interposed between the panel parts 110 and 120. The open edge 10 is formed by the folded edge 112 of the sheet part 11 and the end edge 123 of the panel part 120. The engagement tool 13 extends across the widths of the sheet part 11 (panel part 110) and the panel part 120. The adhesive 16 is interposed between the flap part 111 and the panel part 120 and extends across the widths of the sheet part 11 (the panel part 110) and the panel part 12 to peelably adhere the flap part 111 and the panel part 120 to each other. In FIGS. 10A to 10C, for the sake of convenience, the flap part 111 and the panel part 120 are separated from each other.

The end edge 123 of the panel part 120 is shifted from the folded edge 112 in a direction away from the engagement tool 13. This further facilitates opening the bag.

The bag 1 may have a through hole (not shown) located between the open edge 10 and the adhesive 16 and pretreating the panel parts 110 and 120 and the flap part 111, and may further include a handle (not shown) formed by the panel parts 110 and 120 and the flap part 111 between the through hole and the open edge 10. Also, the bag 1 in FIG. 10A to FIG. 10C may include the same additional features as those included in the aforementioned bags.

Where the bag making apparatus makes the bags 1 illustrated in FIG. 10A, it is configured as follows. The folding device 72 is configured to fold only one side section 42/43 of both side sections 42 and 43 of the web 4 along the fold line 4*a*/4*b*. For example, the folding device 72 folds the side section 42 along the first fold line 4*a*, but does not fold the side section 43. In this example, the applicator 71 is configured to apply the adhesive 5 in the longitudinal direction of the web 4 to the side section 42 on the surface 40 using the application unit 710 and to the side section 43 (which is not folded) on the surface 41 using the application unit 711. In addition, the second folding device 73 is configured to fold it along the second fold line 4*c* such that the side sections 42 and 43 face each other with the adhesive 5 interposed therebetween. The subsequent configurations and steps are substantially the same as those in the aforementioned examples. In this example, the end edge 123 of the panel part 120 is formed from the side edge 430 of the web 4.

Either one of the application units 710 and 711 may be dispensed with, and this case results in the bag 1 in FIG. 10B or FIG. 10C.

Also, as an example, viscose adhesive/a seal having an adhesive surface of viscose adhesive may be interposed between the first and second flap parts 111 and 121 by means of applying/affixing to peelably adhere the flap parts 111 and 121 to each other and to enable resealing the bag 1 after opening it. This extends the effectiveness of the desiccant or oxygen absorbing material packed, and contributes to restraining deterioration of the contents, such as food products.

In making the bags 1, it is possible to appropriately select the distance and arrangement from the peelable adhesive part with the adhesive 16 to the through hole 18, the distance from the engagement tool 13 to the open edge, the length (area L) of the flap parts 111 and 121, and the presence or absence of sealing at the notches 20, etc., taking into consideration the balance of the entire bag and the easiness of opening the bag, etc. For example, sealing at the notches 20 may be performed to prioritize the stability of the bag (to prevent the handle 19 from flapping) if the bag 1 in FIG. 4A is longitudinal in shape and the contents therein are also longitudinal in shape. On the other hand, if the contents are individually packaged confectioneries, sealing at the notches 20 may not be performed and the dimension of the area L may be set shorter so that the bag can be opened at the section which is right upper to the engagement tool 13, in order to prioritize easiness of taking out the contents.

Figure 11A:
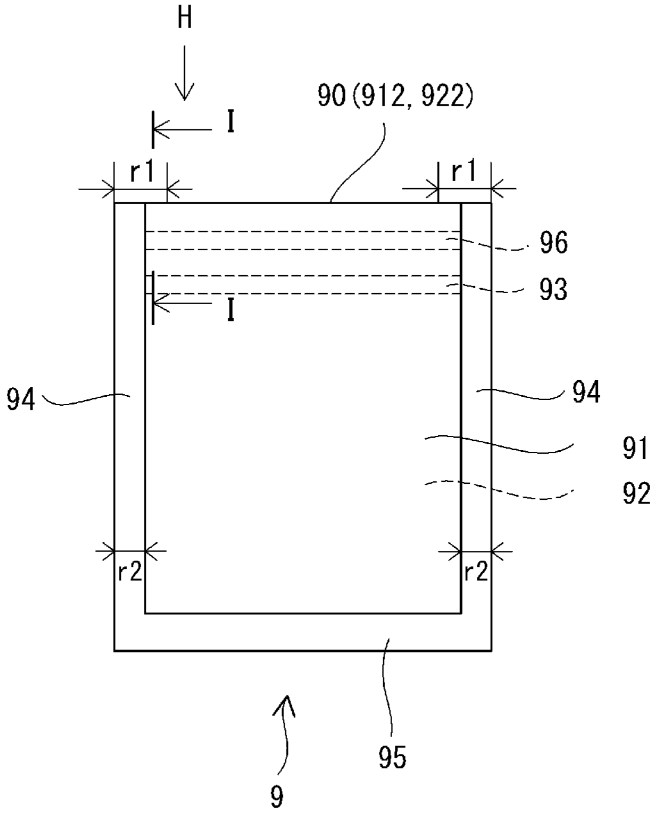
Related Art FIG. 11A
FIG. 11A is a front view of a reference example bag.
Figure 11B:
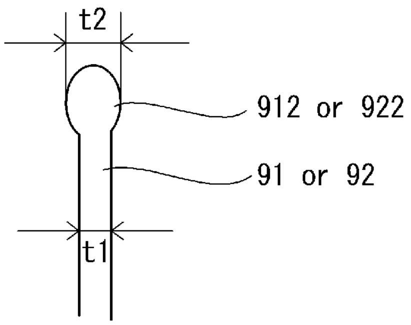
Related Art FIG. 11B
FIG. 11B is a cross section taken along a I-I line in FIG. 11A, illustrating a toasted edge.

<Reference Examples> Reference examples will be described below. FIG. 11A illustrates a reference example bag 9. The bag 9 in FIG. 11A is an improvement of the bag 3 according to the prior art in FIG. 5A. The method for making the bags 9 includes, before the step for forming the cross sealed section 93, locally toasting the edges 912 and 922 of the panel parts 91 and 92 (which constitute the open edge 90 of bag 9) in the predetermined range (2×r1) that is centered on the position of cross-cutting, to make these edges rounded as illustrated in FIG. 11B and each have a maximum thickness t2 that is greater than the thickness t1 of the panel part 91, 92. This causes the portions each with thickness t2 to be located protruding from the cross sealed section 94 by a length (r1−r2) inward of the bag 9 at the opposite ends of the shaped bag 9. Here, the reference sign r1 designates the area actually toasted, and the reference sign r2 designates the width of the cross sealed section 94. The method for toasting an edge is disclosed in WO2019/123876A1.

The reference numeral 93 designates an engagement tool having the same configuration as the engagement tool 13 in the above examples. The reference numeral 95 designates a bottom sealed section having the same configuration as the bottom sealed section 15 in the above examples. The reference numeral 96 designates a peelable adhesive having the same configuration as the adhesive 16 in the above examples.

Figure 12A:
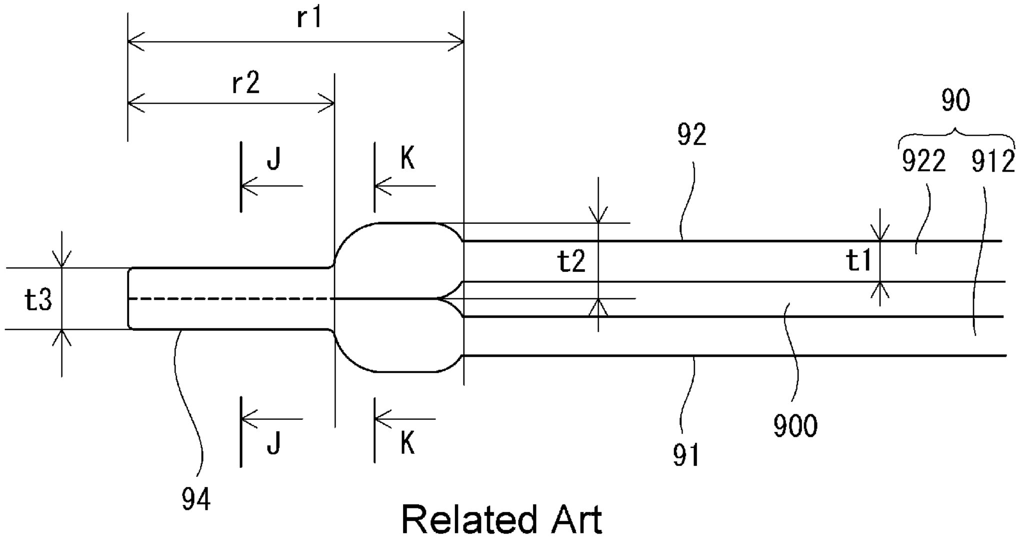
Related Art FIG. 12A
FIG. 12A is an H-line arrow view of FIG. 11A.
Figure 12B:
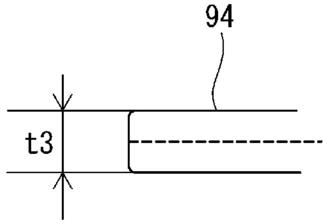
Related Art FIG. 12B
FIG. 12B is a cross sectional view taken along a J-J line in FIG. 12A.
Figure 12C:
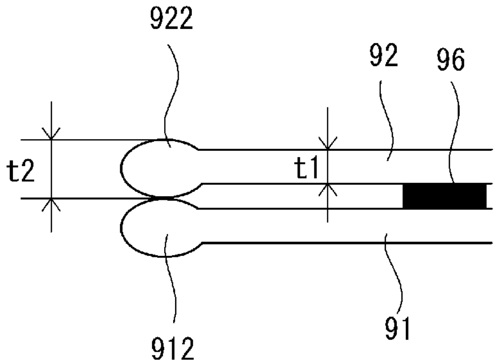
Related Art FIG. 12C
FIG. 12C is a cross sectional view taken along a K-K line in FIG. 12A.

FIG. 12A is an H line arrow view of FIG. 11A, and FIG. 12B is a J-J line cross section of FIG. 12A, and FIG. 12C is a K-K line cross section of FIG. 12A. In forming the cross sealed section 94 using the seal bars after the step for toasting, the portions each with the thickness t2 of the edges 912 and 922 in the sealed area (see the reference sign r2) are pressed against each other by the seal bars into a portion with a thickness t3 (<2×t2). As a result, the portions each with the thickness t2 of the edges 912 and 922 have the remaining length (r1−r2) and are located protruding from the cross sealed section 94 inward of the bag 9. The remaining portions each with the thickness t2 form a gap 900 between the panel parts 91 and 92 at the open edge 90 of the bag 9. This gap 900 facilitates peeling off the adhesive 96 by pinching the panel part 91, 92, and thus opening the bag 9.

Figure 13:
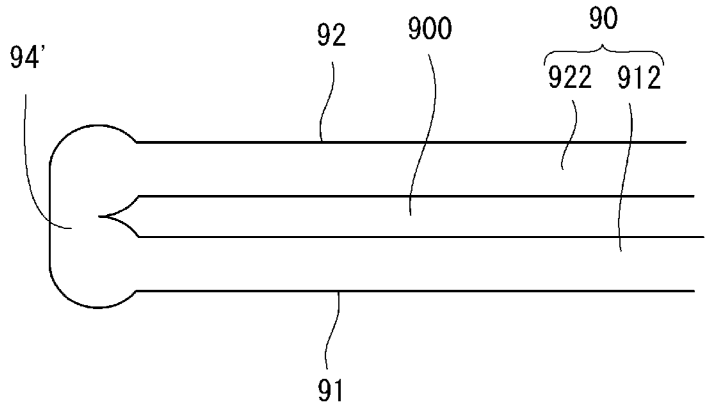
Related Art FIG. 13
FIG. 13 is an enlarged view of an open edge of another reference example bag.

Instead of the cross sealed section 94, it is possible to seal the opposite sides of the bag 9 by cross-cutting the panel parts 91 and 92 by means of fusion cutting in the way as disclosed in JP2007-39087A and WO2019/123875A1. As illustrated in FIG. 13, a gap 900 that facilitates opening the bag 9 is formed by the fuse-cut edge 94' resulting from fusion cutting.

For reference information, the advantages of a bag with a zipper and part-coating/hot melt over a bag with a zipper and a notch are as follows.

Bag with a notch: In the manufacturing step, after creating a notch serving as a trigger for tearing, it requires a scoring process using a laser or a process for cutting the film by approximately half of its thickness in advance in order the tear line to be parallel to the zipper. Furthermore, in order to make the strength of the film have orientations, it is sometimes strengthened or weaken in advance in the direction in which it can extend. Thus, the burden on manufacturing is unexpectedly large.

Bag with part-coating/hot melt: it does not require the above processes for the bag with a notch, as it does not require tearing for opening thereof. In addition, it does not require giving the strength of the film the orientations, and the film having uniform strength can be used without any problems. Consequently, a thin film can be used, leading to eco-friendliness.

The invention claimed is:

1. A bag making apparatus for making bags from a web and a continuous engagement tool, the web having a first surface, a second surface, a first side section and a second side section, the continuous engagement tool comprising a first member and a second member which are detachably engaged with each other, the bag making apparatus comprising:

an applicator applies adhesive to at least one of the first side section or the second side section on the first surface in a longitudinal direction of the web;

a first folding device folds the web along two first fold lines extending in the longitudinal direction of the web, wherein the first and second side sections face the second surface after folding of the web along the two first fold lines;

a second folding device folds the web along a second fold line extending in the longitudinal direction of the web between the two first fold lines after application of the adhesive and folding of the web along the two first fold lines, wherein the first and second side sections face each other with the adhesive interposed therebetween after folding of the web along the second fold line;

a welding device welds the first and second members to the second surface in the longitudinal direction of the web; and a cross cut device cross-cuts the web, the continuous engagement tool and the adhesive in a width direction of the web after welding of the first and second members and folding of the web along the second fold line to make bags each having an open edge formed from two folded edges which result from the folding of the web along the two first fold lines.

2. The bag making apparatus of claim 1, wherein the adhesive is heat-sensitive adhesive, and wherein the bag making apparatus further comprises a heat device which heats the heat-sensitive adhesive to peelably adhere the first and second side sections to each other via the heat-sensitive adhesive.

3. The bag making apparatus of claim 1, further comprising a slit device which slits the web along the second fold line after the folding of the web along the second fold line.

* * * * *